United States Patent [19]

Yarbrough

[11] Patent Number: 5,243,132
[45] Date of Patent: Sep. 7, 1993

[54] DRAIN HOLE CORE FOR EXPLOSION-PROOF DRAIN SEAL FITTINGS

[75] Inventor: Garrett S. Yarbrough, Manlius, N.Y.
[73] Assignee: Cooper Industries, Inc., Houston, Tex.
[21] Appl. No.: 822,066
[22] Filed: Jan. 17, 1992
[51] Int. Cl.⁵ .............................................. H05K 5/06
[52] U.S. Cl. .................... 174/52.2; 174/52.1; 174/52.3; 264/273
[58] Field of Search ............................ 439/88, 89, 186; 264/273; 29/592.1; 174/140 R, 142, 151, 152 R, 152 E, 152 G, 152 GM, 176, 177, 178, 179, 182, 50, 52.3, 52.4

[56] References Cited

U.S. PATENT DOCUMENTS

| | | | |
|---|---|---|---|
| 3,325,584 | 6/1967 | Herzig | 174/179 |
| 3,735,078 | 5/1973 | Appleton et al. | 200/168 G |
| 4,213,018 | 7/1980 | Piston | 174/50 |
| 4,246,696 | 1/1981 | Bauer et al. | 174/179 |
| 4,281,943 | 8/1981 | Viennot | 174/179 |
| 4,355,200 | 10/1982 | Wheeler et al. | 174/179 |
| 4,791,247 | 12/1988 | Cacalloro et al. | 174/152 R |
| 4,846,163 | 7/1989 | Bannister, Jr. et al. | 128/124 |
| 5,123,627 | 6/1992 | Hodges | 251/146 |

FOREIGN PATENT DOCUMENTS

87/06765 11/1987 World Int. Prop. O. ... 174/152 GM

OTHER PUBLICATIONS

Appleton Electric Company, "NEC Sec. 501-5 Highlights on Sealing Fitting Requirements", Jul. 1, 1988, (4 pp.).
O-Z/Gedney, "Hazardous Location Drain/Seal Fittings", 1986 (p. B25).
Crouse-Hinds, "Drains and Breathers", Oct. 1983, (1 p.).
Crouse-Hinds, "Condulet Sealing Fittings with Drains", Oct. 1983, (2 pp.).
Crouse-Hinds, "Installation Instructions for Conduit Sealing in Hazardous Locations", 1987, (2 pp.).

*Primary Examiner*—Leo P. Picard
*Assistant Examiner*—Bot Ledinh
*Attorney, Agent, or Firm*—David A. Rose

[57] ABSTRACT

The drain hole core for a drain seal fitting includes an elongated elastomeric member having a handle on one end, a rod-like member on the other end, and a integral plug between the handle and rod-like member. The drain hole core is inserted into the drain opening of the drain seal fitting such that the rod-like member extends up into the bore extending through the drain seal fitting and the plug seals the drain opening. A dam seals that area between the electrical wiring and the internal circumferential wall of the lower portion of the drain seal fitting. A sealing compound is then poured into an access opening in the side of the drain seal fitting so as to seal the bore of the drain seal fitting and to cover a portion of the rod-like member. Once the rod-like member is removed, it acts as a mold and provides a drain path from that portion of the bore above the sealing compound to the drain opening. The drain opening is then closed with a drain fitting. Upon the accumulation of water above the sealing compound, the accumulated water passes through the drain path and out the drain fitting.

8 Claims, 1 Drawing Sheet

DRAIN HOLE CORE FOR EXPLOSION-PROOF DRAIN SEAL FITTINGS

BACKGROUND OF THE INVENTION

The present invention relates to electrical installations, and more particularly to electrical conduit fittings for hazardous locations. More particularly still, the present invention relates to a drain hole core for forming a drain hole in drain seal fitting to prevent the accumulation of water in an electrical conduit.

The electrical wiring extending from one portion of an electrical installation to another, passes through metal conduit to protect the electrical wiring. Fittings with seals are installed in the conduit to prevent the passage of gases, vapors or flames from one portion of the electrical installation to another through the conduit thereby limiting any explosion in the enclosure and preventing pre-compression or "pressure piling". The National Electrical Code requires that seals be installed in specific locations. While not a National Electrical Code requirement, many engineers consider it good practice to sectionalize long electrical conduit runs by inserting seals approximately 50 to 100 feet apart, depending upon the conduit size, to minimize the effects of "pressure piling". Breathers or vents, are installed in the top of the enclosure to provide ventilation to minimize condensation in the enclosure.

Conduit seals are not intended to prevent the passage of liquids, gases or vapors at a continuous pressure differential across the seal. Even at differences in pressure across the seal equivalent to a few inches of water, there may be a slow passage of gas or vapor through a seal and through the electrical conductors passing through the seal.

Various considerations are made in selecting an appropriate seal fitting. Initially, the seal must be appropriate for the particular hazardous vapor involved. Then, a sealing fitting is selected for proper use with respect to its mounting position in the conduit run. This is particularly critical when the conduit runs between hazardous and non-hazardous areas. If the seal fitting is improperly positioned, hazardous gases or vapors may enter the system beyond the seal and permit the hazardous gases or vapors to escape into another portion of the hazardous area or to enter a non-hazardous area. Some seal fittings are designed to be mounted in any position. Other seal fittings are restricted to vertical mounting.

The seals include a fiber and compound. The fiber is used to provide a dam inside the fitting while filling the fitting with compound while it is in its liquid state. The compound, when properly mixed and poured, hardens into a dense, strong mass which is insoluble in water, is not attacked by petroleum products, and is not softened by heat. It will withstand, with ample safety factor, pressure of the exploding trapped gases or vapor. Electrical conductors sealed in the compound should be of the approved thermoplastic or rubber insulated type.

In locations which are usually considered dry, surprising amounts of water frequently collect in the conduit systems. No conduit system is air tight, therefore, it may "breath". Alternate increases and decreases in temperature and/or in barometric pressure, due to weather changes or due to the nature of the process carried on at the location where the conduit is installed can result in condensation and water accumulation within the conduit. Outside air is drawn into the conduit system when it "breaths in". If this air carries sufficient moisture it will be condensed within the conduit when the temperature decreases and chills this air. The internal conditions being unfavorable to evaporation, the resultant water accumulation will remain and be added to by repetitions of the breathing cycle. In view of this likelihood, it is therefore good practice to ensure against such water accumulations and possible subsequent insulation failures by installing breathers, drain seals, or inspection seals.

Seal fittings with drains are installed in the conduits in humid atmospheres or in wet locations where it is likely that water can gain entrance to the interiors of the enclosures or conduits. The conduits typically are inclined so that water will not collect in the enclosures or on the seals, but will be led to low points in the conduit runs where the water may pass out through the drains. Frequently, however, the arrangement of conduit runs makes this method impractical if not impossible. Drain seal fittings allow the draining of the water to prevent harmful accumulations of water above the seal.

The prior art method of providing a drain hole through the sealing compound of an explosion-proof drain seal fitting includes the use of a combination of a soft wire, inserted in a rubber tube, and a fiber washer. The wire/tubing core is inserted through the fiber washer, which is then inserted into the drain opening of the fitting. Seal fittings of the trade, sizes one-half inch to three inches inclusive, have round threaded cover openings of ample size for the placing of fiber dams in the conduit hub.

The sealing compound has to be set for a period of time, usually a minimum of two hours, before the wire/tubing core is removed. The wire is first pulled out of the tubing, then the tubing is pulled out of the fitting, leaving a path through the sealing compound for drainage.

Often the washer, which provides a dam for the unset compound, is not positioned correctly and thereby allows the sealing compound to flow into and fill the threads where the drain seal fitting is to be installed.

If the wire/tubing core is not removed after the seal is poured, or if the protruding end is cut off as observed in some installations, it will impair the function of draining water from the conduit. The top of the tubing inside the seal normally extends above the top of the sealing compound. Water can accumulate on top of the seal until the height of the tubing is reached, before any draining can occur. The presence of the wire inside the tubing will block or greatly restrict water drainage.

Since it is possible to remove the core, or cut it off at the opening, it is difficult to inspect a drain seal to determine if it was installed correctly.

SUMMARY OF THE INVENTION

The drain hole core of the present invention includes an elongated elastomeric member having a handle on one end, a rod-like member on the other end, and a plug between the handle and rod-like member. The drain hole core is molded into one integral member. The rod-like member is tapered and is slidingly received through a drain hole in a drain seal fitting. The rod-like member extends up into the upper portion of the bore extending through the drain seal fitting. The plug is also tapered and thereby seals the drain hole in the drain seal fitting.

The drain hole core is inserted through the drain opening in the drain seal fitting with the rod-like member extending into the bore of the drain seal fitting through which the electrical wiring passes. The plug seals the drain opening. The area between the electrical wiring and the inner wall of the drain seal fitting is dammed to hold the sealing compound. A sealing compound in its liquid state is poured through another access opening into the drain seal fitting and onto the dam. The bore is filled with sealing compound so as to cover a portion of the rod-like member and seal off the bore. The sealing compound is then allowed to set up and solidify such that the core acts as a mold. Once the drain hole core is removed, a drain path is formed by that portion of the rod-like member covered with sealing compound. A drain fitting is then installed into the drain hole.

When the drain hole core is positioned in the drain seal fitting, it closes off the threaded entry preventing any sealing compound from filling the threads. When pulled out, a drain path, flush with the top of the compound, provides immediate draining of any water before accumulation occurs. The appearance of the invention in the installed drain seal fitting opening makes it obvious that it must be removed before installation is complete. The handle includes a pullout ring which is highly visible on the outside of the fitting providing an indication that the installation is not complete. The invention may be brightly colored to accentuate this condition.

The pullout ring provides a simple method for gripping and removing the drain hole core after the sealing compound has set. The drain hole core is made of an elastomeric material which does not stick easily to cement or epoxy sealing compounds. The drain hole core is tapered to ease removal once tension is applied to the pullout ring. As tension is applied to the pullout ring, the core stretches, thus reducing in diameter and breaking free from the set or cured compound.

Other objects and advantages of the invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 1:
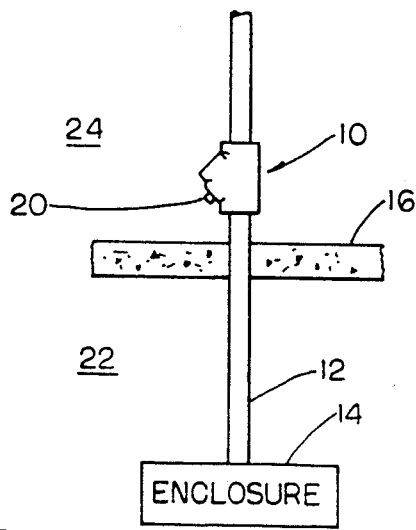
FIG. 1 is an elevation view, partly in cross-section, of the installation of the drain seal fitting of the present invention.

Referring initially to FIG. 1, there is shown a typical electrical installation utilizing the explosion-proof drain seal fitting 10 incorporating the drain hole core 20 of the present invention. A conduit 12 is shown run from an enclosure 14 to be sealed and through a boundary 16. Boundary 16 extends between a hazardous area 22 and a non-hazardous area 24. The drain seal fitting 10 is shown inserted into conduit 12 to minimize the passage of gases and vapors and prevent the passage of flames through conduit 12 from hazardous area 22 to non-hazardous area 24. Typically, drain seal fittings are inserted every 50 to 100 feet of conduit depending upon the conduit size.

Figure 2:
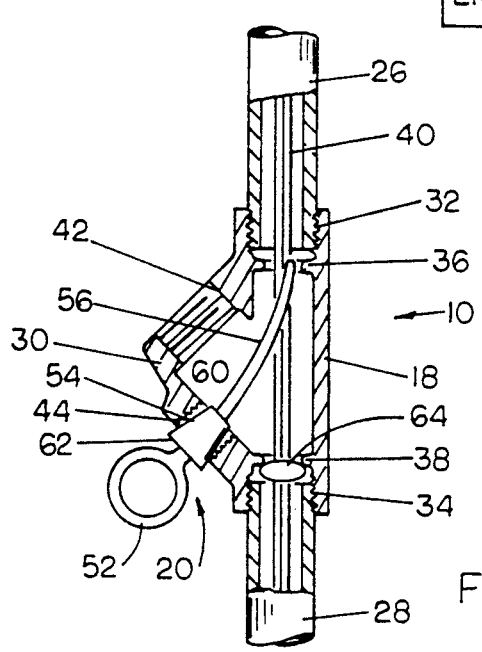
FIG. 2 is a cross-sectional elevation view of the drain seal fitting of FIG. 1 including the drain hole core.

Referring now to FIG. 2, drain seal fitting 10 is shown inserted into conduit 12 between an upper conduit section 26 and a lower conduit section 28. The drain seal fitting 10 shown in the drawings, is particularly designed for sealing vertical conduits such as conduit 12 shown in FIG. 1. It, of course, should be appreciated that the drain seal fitting may be designed to be mounted in any position such as vertical, horizontal, or at some other angle.

The drain seal fitting or hub 10 is generally Y-shaped and has a vertical cylindrical portion 18 and a diverging side cylindrical portion 30. The vertical cylindrical portion 18 includes upper and lower tapered threads 32, 34, respectively, for threaded engagement with the threaded ends of upper and lower conduit sections 26, 28, respectively. Inwardly directed annular shoulders 36, 38 are provided adjacent the bottom of upper and lower threads 32, 34, respectively, to serve as an integral bushing for the terminal ends of upper and lower conduit sections 26, 28. As shown in FIG. 2, an electrical conductor(s) or wire(s) 40 extends through upper and lower conduit sections 26, 28 and through the vertical cylindrical section 18 of drain seal fitting 10.

Figure 3:
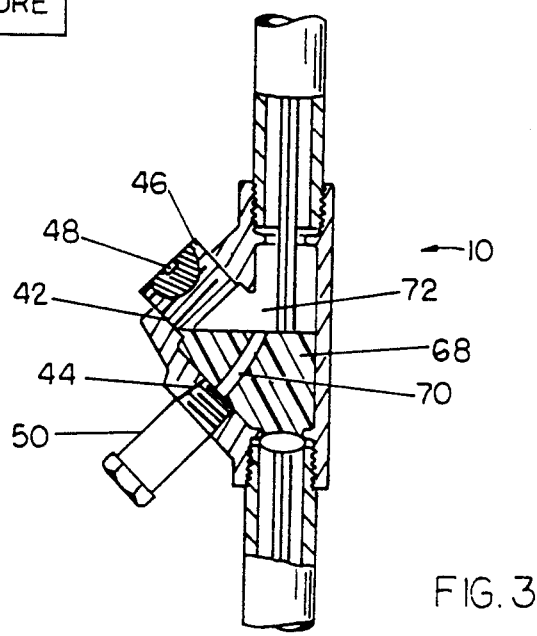
FIG. 3 is a cross-sectional elevational view of FIG. 2 with the sealing compound poured into the drain seal fitting of FIG. 2 and the drain seal installed.

Referring now to FIGS. 2 and 3, the side cylindrical portion 30 of drain seal fitting 10 includes a threaded access hole 42 through the end of side cylindrical portion 30 and a threaded drain hole 44 in the major side of side cylindrical portion 30. Threaded access hole 42 is adapted to receive a threaded pipe plug 46 for closing access hole 42 as shown in FIG. 3. Plug 46 includes a means 48 for rotating plug 46 within access hole 42. Means 48 includes a square cross-sectioned aperture in the top of plug 46 to receive the operative end of a socket wrench (not shown). Threaded drain hole 44 threadingly receives a drain fitting 50 which is explosion-proof. Drain fitting 50 may be an explosion-proof drain of the ECD series, as for example Model No. 17, manufactured by the Crouse-Hinds Division of Cooper Industries, Inc. Typical drain fittings 50 include an aperture therethrough having a core material disposed therein which allows water or moisture to drain through the core material and aperture and yet provide explosion protection.

Figure 4:
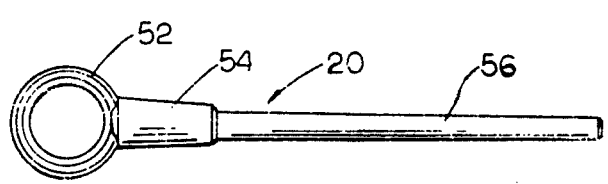
FIG. 4 is a side view of the drain hole core of the drain seal fitting of the present invention shown in FIG. 2.
Figure 5:
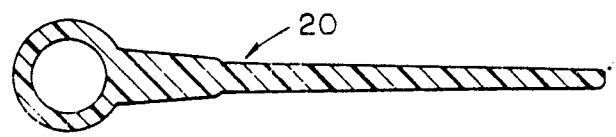
FIG. 5 is a cross-sectional view of the drain hole core shown in FIG. 4.

Referring now to FIGS. 2, 4, and 5, there is shown the drain hole core 20 of the present invention. Drain hole core 20 is an elongated elastomeric member which includes a handle or pullout ring 52, a plug or stopper 54 and a rod-like member 56. The pullout ring 52, stopper 54, and rod-like member 56 are molded into one integral piece. The stopper 54 and member 56 have a taper. The taper of rod-like member 56 is preferably one to two degrees and the taper of stopper 54 is preferably two to three degrees tapering from a major diameter greater than that of hole 42 to a minor diameter less than that of hole 42. It is preferable that the drain hole core 20 is made of a bright color to accentuate its installation. The drain hole core 20 is preferably made of an elastomeric material such as the thermal plastic rubber, SANTOPRENE TM by Monsanto or TPR TM Synthetic Rubber by BP Performance Polymers, Inc. The elastomeric material used for drain hole core 20 is preferably of a material which will not stick easily to a cement or epoxy sealing compound, such as Chico A ® manufactured by Crouse-Hinds.

Referring again to FIG. 2, drain hole core 20 is shown installed in explosion-proof drain seal fitting 10. As shown, the drain hole core 20 is inserted through threaded drain hole 44. The core 56 extends through side cylindrical portion 30 and into vertical cylindrical portion 18. As shown, it is preferred that the terminal end of core 56 extend to a point within vertical cylindrical portion 18 adjacent upper annular shoulder 36. The tapered stopper 54 is tapered such that upon insertion of stopper 54 into threaded drain hole 44, the minor diameter end 60 of stopper 54 will pass through threaded drain hole 44 as the threads of threaded drain hole 44 interferingly engage and embed themselves into the tapered exterior surface of stopper 54 as the major diameter end 62 of stopper 54 advances toward the mouth of threaded drain hole 44.

In installation, the drain seal fitting or hub 10 is inserted between upper and lower conduit sections 26, 28. The electrical conductor(s) or wire(s) 40 is then pulled through conduit 12 and drain seal fitting 10. The pipe plug 46 is removed from access hole 42 and the hub opening adjacent lower annular shoulder 38 and lower threads 44 is dammed with a fiber filler, such as Chico X. The fiber filler 64 closes the annular area formed between electrical conductor or wire 40 and the interior walls of vertical cylindrical portion 18 of drain seal fitting 10 below integral bushing 38 and the interior walls of the upper terminal end of lower conduit section 28.

The drain hole core 20 is then inserted into drain hole 44 with rod-like member 56 projecting upwardly to a location adjacent the upper interior end of drain seal fitting 10. A sealing cement mixture 68 in its liquid state is then poured into access hole 42 as shown in FIG. 3. The dam 64 prevents the sealing compound 68 from flowing into lower conduit section 28. The stopper 54 prevents the sealing compound from engaging the threads of threaded drain hole 44. As the sealing compound 68 sets, that portion of rod-like member 56 which extends through sealing compound 68 acts as a mold and forms a drain flow path 70 from the upper chamber 72 of hub 10 to threaded drain hole 44. The sealing compound sets in approximately two to four hours.

The drain hole core 20 is then removed from threaded drain hole 44 to form drain path 70 in sealing compound 68. The pullout ring 52 provides a means for gripping and handling the drain hole core 20 for its removal after the sealing compound 68 has set. The drain hole core 20 is made of an elastomeric material which does not stick easily to the cement or epoxy sealing compound 68. Once pulling force is applied to the pullout ring 52, the taper of plug 54 and rod-like member 56 assists in the removal of core 20 from fitting 10. Further, as tension is applied to the pullout ring 52, the elastomeric material of the drain hole core 20 stretches, thus reducing the tapered diameters of rod-like member 56 to break free from the set or cured sealing compound 68. Explosion-proof drain fitting 50 is then threaded into threaded drain hole 44 to close off drain path 70.

The drain seal fitting 10 of the present invention is used in humid or wet environments where it is likely that water will gain entrance into the interior of conduit 12. Even in locations which are usually dry, water may still collect in conduit systems such as conduit 12. No conduit is air tight and, therefore, breathes. Alternate increases and decreases in temperature and/or in barometric pressure, due to weather changes or due to the nature of the process carried on in the location where the conduit is installed, will cause breathing, resulting in condensation and water accumulation. Explosion-proof drain fitting 50 allows any water or moisture which has accumulated in chamber 72 of fitting 10 to drain through drain path 70 and the core material in the aperture of drain fitting 50. Otherwise, accumulations of water may damage the seal or the electrical conductor or wire 40.

While a preferred embodiment of the present invention has been shown and described, modifications thereof can be made by one skilled in the art without departing from the spirit of the invention.

I claim:

1. A drain seal fitting for an electrical conduit passing electrical wiring, comprising:
    a housing having a bore therethrough and adapted for insertion in the electrical conduit for passing the electrical wiring therethrough;
    said housing having a side opening;
    a core having a rod-like member and a plug, said rod-like member extending into said bore and said plug closing said side opening; and
    sealing compound in said bore and around said rod-like member forming a drain path upon the removal of said core.

2. The drain seal fitting of claim 1 wherein said housing further includes an access opening for pouring said sealing compound into said bore.

3. The drain seal fitting of claim 1 further including a dam in said bore sealing the annular area formed between the electrical wiring and said housing.

4. The drain seal fitting of claim 3 wherein said sealing compound is poured into said housing onto said drain and is allowed to set to seal off said bore and prevent the passage of gases, vapors and flames through said housing.

5. The drain seal fitting of claim 1 wherein said housing around said side opening is threaded and adapted for threadingly receiving a drain fitting upon the removal of said core.

6. The drain seal fitting of claim 5 wherein said housing is explosion proof.

7. The drain seal fitting of claim 5 wherein any water which has accumulated within said bore may drain through said drain path upon opening said side opening.

8. A method for forming a drain in a drain opening of a drain seal fitting having a bore for the passage of electrical wiring, comprising the steps of:
    inserting a core through the drain opening in the drain seal fitting;
    extending the core into the bore through which the electrical wiring passes;
    plugging the drain opening with an enlarged portion of the core;
    damming the area around the electrical wiring to seal the bore;
    pouring a sealing compound into the bore of the drain seal fitting and onto the dammed area;
    filling the bore to a level covering a portion of the core and sealing off the bore;
    allowing the sealing compound to set around the core which acts as a mold;
    removing the core from the drain seal fitting thereby forming a drain path from that portion of the bore above the sealing compound to the drain opening; and
    closing the drain opening with a drain fitting.

* * * * *